United States Patent [19]

Brown

[11] 4,094,173
[45] June 13, 1978

[54] VEHICLE LOCK

[76] Inventor: Jack H. Brown, 10457 Mazatlan Way, Poway, Calif. 92064

[21] Appl. No.: 775,712

[22] Filed: Mar. 9, 1977

[51] Int. Cl.$^2$ ............................................. E05B 65/12
[52] U.S. Cl. ........................................ 70/237; 70/232
[58] Field of Search ................... 70/14, 58, 177, 180, 70/200, 227, 229–232, 237, 258, 259, 260, 238, 245, 255

[56] References Cited

U.S. PATENT DOCUMENTS

| 619,795 | 2/1899 | Schreiner | 70/232 |
| 2,316,695 | 4/1943 | Jaffa | 70/232 |
| 3,120,116 | 2/1964 | Burrell | 70/232 |
| 3,665,739 | 5/1972 | Boll | 70/229 |

OTHER PUBLICATIONS

Popular Mechanics, "Theft of Auto Tires Discouraged by Locking Wheel Nuts", Mar., 1944, p. 96.

*Primary Examiner*—Kenneth J. Dorner
*Attorney, Agent, or Firm*—Charles C. Logan, II

[57] ABSTRACT

A vehicle lock for releasably locking an engine block of a motor vehicle to an abutting transmission wherein the transmission housing has a plurality of bolt holes disposed in the peripheral portion thereof and the engine block has a plurality of registered bolt holes in marginal flanges integral with the engine block. A bolt having a head portion on one end and a threaded portion on its other end is received in one of said engine block and transmission housing registered bolt holes and has a length projecting therefrom. The projecting threaded end of the bolt is inserted into an aperture in the closed bottom end of a cup member that has an upwardly extending cylindrical wall and an open top. A nut is threadably received on the threaded end portion of the bolt and the nut is disposed within the cup member and spaced from its open end. Spaced inwardly from the open end of the cup are a pair of opposed apertures and a shackle of a padlock passes therethrough them. A floating disc having a diameter slightly smaller than the interior diameter of the cup is disposed within the cup between the threaded end of the bolt and the shackle of the padlock thereby preventing insertion of a special probe into the cup in order to gain access to the threaded nut.

1 Claim, 2 Drawing Figures

VEHICLE LOCK

BRIEF DESCRIPTION OF THE INVENTION

The present invention relates to a vehicle lock and more particularly to an engine lock which locks the vehicle engine housing to the transmission housing or automobile vehicle frame.

According to the invention, a vehicle lock is provided in which a bolt shank is passed through an aperture in the engine housing and an aperature in either the vehicle transmission housing or the vehicle frame. The bolt head is irregularly shaped so that it is captured by the housing or frame. The threaded end of the bolt is passed through an aperture in the bottom of a cup member and a threaded nut is engaged therewith. A floating disc is inserted into the cup member in proximity with the threaded end of the bolt shank. The diameter of the floating disc is slightly smaller than the interior diameter of the cup member. A padlock is then inserted through two aperatures in the cup toward the open end thereof. The distance between the bottom of the cup and the shackle of the padlock that passes through the two apertures in the cup member is less than the diameter of the disc. This assembly will then prevent the removal of the nut and hence the removal of the bolt shank which ties the engine housing to the transmission housing or the vehicle frame. It has been found extremely effective against the theft of small engines such as the Volkswagon.

An object of the present invention is the provision of a vehicle engine lock.

Another object of the invention is the provision of a vehicle engine lock which is inexpensive to manufacture and simple to install.

A further object of the invention is the provision of a vehicle engine lock which is effective against engine theft.

Other objects and many of the attendant advantages of the present invention will be readily appreciated as the same becomes better understood by reference to the following detailed description when considered in connection with the accompanying drawings in which like reference numerals designate like parts throughout the Figures thereon and wherein:

FIG. 1 is a perspective view partially broken away of the preferred embodiment of the present invention; and FIG. 2 is a schematic view of the embodiment of FIG. 1 in situ.

DETAILED DESCRIPTION OF THE DRAWINGS

Figure 1:
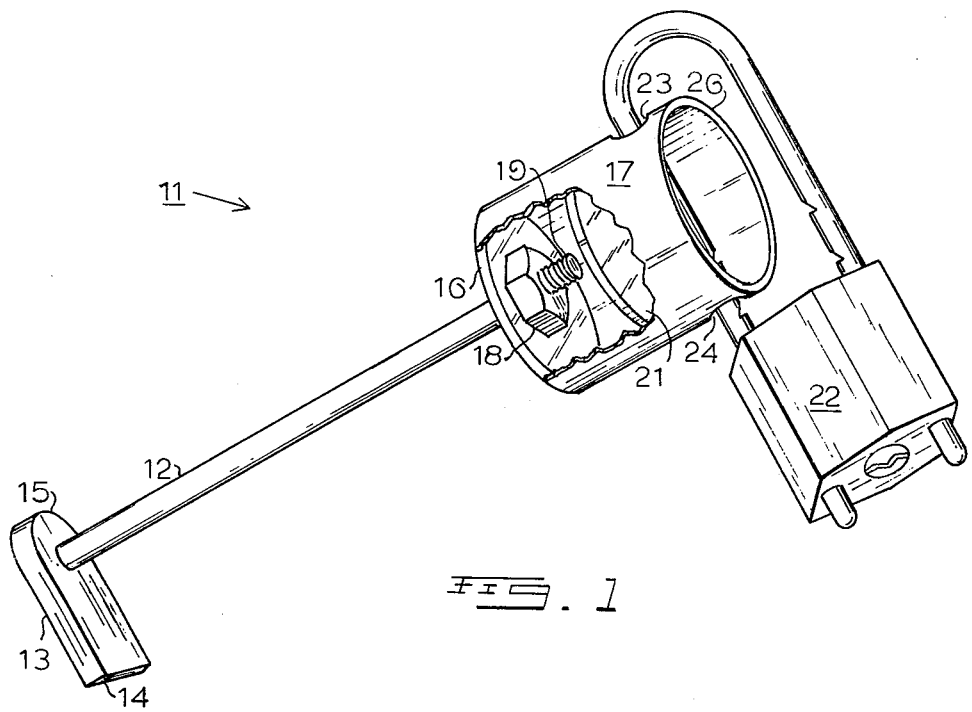

Referring to FIG. 1, the assembled vehicle engine lock is shown generally at 11 having a bolt 12 with a special bolt head 13 having a flat end 14 and an arcuate end 15. Cup member 17 has a closed end 16 with a cylindrical wall extending upwardly therefrom with an open end at the top of the cylindrical wall. The closed end of the cup has an aperture for receiving the threaded portion 19 of bolt 12. A nut 18 is threadably engaged with the threaded end 19 of bolt 12. A floating disc 11 is disposed above threaded portion 19 of bolt 12. The diameter of the floating disc is slightly smaller than the interior diameter of the cup member. A shackle of padlock 22 is passed through diametrically opposed apertures 23 and 24 disposed toward the open end 26 of cup member 17. The distance between the bottom of the cup and the apertures 23 and 24 through which the shackle of the padlock passes is less than the diameter of the disc. The cylindrical wall of cup member 17 is free from any other apertures that would give access to the nut by a tool utilized to tighten or loosen a nut.

Figure 2:
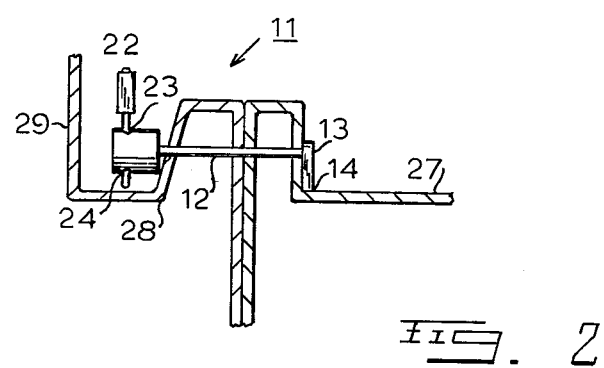

Referring to FIG. 2, lock assembly 11 is again shown having a bolt member 12 with a special head 13 having a flat portion 14 abutting transmission housing 27. Bolt 12 passes through transmission housing 27 and engine housing 28 into cup member 29. Cup member 29 has apertures 23 and 24 which receive padlock 22.

OPERATION

Referring back to FIGS. 1 and 2, it can be seen that if bolt 12 is passed through apertures in engine housing 28 and transmission housing 27 with the flat edge 14 of bolt head 13 abutting transmission housing 27 in the manner illustrated in FIG. 2, and threaded nut 18 tightened down on threaded portion 19 of bolt 12 so that one edge of cup member 17 abuts engine housing 28, the unit cannot be rotated due to the abutment of flat portion 14 of bolt head 13 and the length of padlock 22 (which can be a common bicycle lock). It is also evident that a wrench cannot be inserted in the open end of the cup member 17 because of the blockage of padlock 22 through apertures 23 and 24. Should a prying device be inserted within open end 26 of cup 17, free floating disc 21 insures that is could not be utilized against threaded nut 18. The diameter of the floating disc is slightly smaller than the interior diameter of the cup member so that it completely hides the bottom of the cup member when the disc is parallel to the bottom 16 of the cup. Any attempt to pivot the disc would also prove fruitless due to the dimensional relationship of the disc diameter to the distance between the bottom of the cup and the apertures which quickly limits the pivotal movement of the disc due to its coming into blocking engagement with the shackle of the padlock. At the point at which the disc is pivoted into blocking engagement with the shackle, there is still no access to the nut by a tool used to tighten or loosen nuts. In this regard it is also pointed out that the dimensions of cup member 17 in the drawing have been exaggerated for clarity purposes and that the components would fit in a much closer proximity to each other. It is also pointed out that transmission housing 27 could also be a portion of the frame of a vehicle.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

What is claimed is:

1. An anti-theft device for releasably locking an engine block of a motor vehicle to an abutting transmission, the transmission having a housing with a plurality of bolt holes disposed in the peripheral portion thereof and the engine block having a plurality of registered bolt holes in marginal flanges integral with the engine block, comprising:

a bolt having a head portion on one end and a threaded portion on its other end, said bolt receivable in one of said engine block and transmission housing registered bolt holes and having a length so as to project therefrom, said head portion having a flat end and an arcuate end opposite said flat end;

a cup member having a closed end, a cylindrical wall extending upwardly from said closed end and an open end at the top of said cylindrical wall, said closed end having an aperture for receiving said threaded portion of said bolt;

a nut threadably received on said threaded end portion of said bolt and being disposed within said cup member and spaced from its open end, said nut being capable of being tightened on said threaded portion to draw the bottom closed end of said cup into engagement with the flanges of the engine block;

spaced inwardly from the open end of said cup are a pair of apertures with one aperture being on the opposite side of the cylindrical wall from the other aperture;

a padlock having one of its shackles passing through said opposing aperture in said cylindrical wall thereby preventing a tool such as the socket of a socket wrench set from being inserted on to said nut;

said cup cylindrical wall being free from any additional aperture that would give access to said nut by a tool utilized to tighten or loosen said nut; and a floating disc disposed within said cup member between the threaded end of said bolt and the shackle of the padlock that passes through the apertures in the cylindrical wall, said floating disc having a diameter slightly smaller than the interior diameter of said cup member, said floating disc being restricted in rotation due to abutment with the threaded end of said bolt and the shackle when attempts are made to pivot it thereby preventing insertion of a special probe into said cup in order to gain access to said threaded nut.

* * * * *